(12) United States Patent
Tomatsu et al.

(10) Patent No.: US 11,268,847 B2
(45) Date of Patent: Mar. 8, 2022

(54) SEAT LOAD DETECTION METHOD AND SEAT LOAD DETECTION APPARATUS

(71) Applicant: AISIN SEIKI KABUSHIKI KAISHA, Kariya (JP)

(72) Inventors: Yoshiaki Tomatsu, Toyoake (JP); Noriyuki Nishizawa, Kariya (JP); Ryohei Fuwa, Anjo (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 785 days.

(21) Appl. No.: 16/104,218

(22) Filed: Aug. 17, 2018

(65) Prior Publication Data

US 2019/0072426 A1   Mar. 7, 2019

(30) Foreign Application Priority Data

Sep. 5, 2017   (JP) .............................. JP2017-170477

(51) Int. Cl.
| | |
|---|---|
| *B60N 2/00* | (2006.01) |
| *G01G 19/414* | (2006.01) |
| *B60R 21/0136* | (2006.01) |
| *B60R 21/015* | (2006.01) |
| *B60N 2/07* | (2006.01) |

(52) U.S. Cl.
CPC ......... *G01G 19/4142* (2013.01); *B60N 2/002* (2013.01); *B60N 2/0732* (2013.01); *B60R 21/0136* (2013.01); *B60R 21/01512* (2014.10); *B60R 21/01556* (2014.10); *B60R 21/01558* (2014.10)

(58) Field of Classification Search
CPC ............ G01G 19/4142; B60R 21/0136; B60R 21/01556; B60R 21/01512; B60R 21/01558; B60N 2/002; B60N 2/0732
See application file for complete search history.

(56) References Cited

U.S. PATENT DOCUMENTS

| | | |
|---|---|---|
| 6,643,575 B2 | 11/2003 | Ishida et al. |
| 8,328,276 B2 | 12/2012 | Inayoshi et al. |
| 10,573,093 B2 * | 2/2020 | Breed .................... G07C 5/008 |

(Continued)

FOREIGN PATENT DOCUMENTS

| | | |
|---|---|---|
| JP | 2001-114052 A | 4/2001 |
| JP | 2003-81051 | 3/2003 |

(Continued)

OTHER PUBLICATIONS

Japanese Office Action dated Aug. 17, 2021 in Japanese Patent Application No. 2017-170477 (with English translation), 8 pages.

*Primary Examiner* — Masud Ahmed
(74) *Attorney, Agent, or Firm* — Oblon, McClelland, Maier & Neustadt, L.L.P.

(57) ABSTRACT

A seat load detection method includes a process in which a control unit records a transition of a load detection signal and a transition of a seat load, a process in which the control unit specifies a timing when a load sensor detects a collision of a vehicle based on a transition record of the load detection signal, and a process in which the control unit calculates a correction value of the seat load based on a difference value between a stable seat load provided after the control unit detects the collision of the vehicle and a stable seat load provided before the load sensor detects the collision of the vehicle.

9 Claims, 8 Drawing Sheets

(56) References Cited

U.S. PATENT DOCUMENTS

| | | | |
|---|---|---|---|
| 10,788,580 B1* | 9/2020 | Kavaler | G08G 1/14 |
| 10,981,459 B1* | 4/2021 | Davey, Jr. | B60L 53/16 |
| 10,981,526 B2* | 4/2021 | Celinske | B60L 3/0046 |
| 2014/0265475 A1* | 9/2014 | Fujii | B60N 2/90 |
| | | | 297/217.1 |
| 2015/0122556 A1* | 5/2015 | Honda | G01G 19/4142 |
| | | | 177/136 |
| 2017/0297460 A1* | 10/2017 | Akaike | B60N 2/22 |
| 2021/0114476 A1* | 4/2021 | Spaninks | B60L 53/18 |
| 2021/0116256 A1* | 4/2021 | Konrardy | G05D 1/0061 |

FOREIGN PATENT DOCUMENTS

| | | |
|---|---|---|
| JP | 2011-43454 | 3/2011 |
| JP | 2012-32312 A | 2/2012 |
| JP | 2015-89762 | 5/2015 |

* cited by examiner

SEAT LOAD DETECTION METHOD AND SEAT LOAD DETECTION APPARATUS

CROSS REFERENCE TO RELATED APPLICATIONS

This application is based on and claims priority under 35 U.S.C. § 119 to Japanese Patent Application 2017-170477, filed on Sep. 5, 2017, the entire content of which is incorporated herein by reference.

TECHNICAL FIELD

This disclosure generally relates to a seat load detection method and a seat load detection apparatus.

BACKGROUND DISCUSSION

A known method for detecting a seat load in response to a load detection signal outputted from a load sensor provided at a vehicle seat is disclosed in JP2003-81051A (hereinafter referred to Patent reference 1). According to Patent reference 1, for example, the seat load detection method calculates a correction value of the seat load based on seat loads (a difference value) before and after the collision in a case where the collision of the vehicle is detected. In addition, methods detecting the collision of the vehicle based on the variance of a load detection signal outputted by a load sensor are disclosed in JP2011-43454A and JP2015-89762A (Hereinafter referred to as Patent reference 2 and Patent reference 3).

Specifically, a seat load detection apparatus (a vehicle impact determination apparatus) disclosed in Patent reference 2 determines the collision of the vehicle in a case where the seat load which is equal to or lower than a predetermined value in a separating direction (lifting up direction or load reduction direction) is detected within a predetermined time after the seat load which is equal to or greater than the predetermined value in a contracting direction (pressing down direction or load increase direction) is detected based on a load detection signal outputted by the load sensor. The seat load detection apparatus also determines the collision of the vehicle in a case where the seat load which is equal to or greater than the predetermined value in the contracting direction is detected within the predetermined time after the seat load which is equal to or lower than the predetermined value in the separating direction is detected. A seat load detection apparatus (a seat apparatus for a vehicle) disclosed in Patent reference 3 determines the collision of the vehicle by a seat load (an absolute value) in a separating direction which comes to be greater than a predetermined value.

However, in a case where the load sensor provided at the seat includes a configuration functioning as a collision sensor, a difference in time (a time-lag) between a timing when a control unit detects the collision of the vehicle in response to a collision signal outputted by the load sensor and a timing when the collision actually occurs increases. That is, the collision detection by the control unit may be delayed by the time that is required for the load sensor to output the collision signal in response to the variance of the load detection signal. Accordingly, because the seat load that is detected after the collision detection may not be corrected precisely, there is a room for improvement regarding this point.

A need thus exists for a seat load detection method and a seat load detection apparatus which is not susceptible to the drawback mentioned above.

SUMMARY

According to an aspect of this disclosure, a seat load detection method includes a process in which a load sensor provided at a seat of a vehicle outputs a load detection signal relative to a control unit, a process in which the control unit detects a seat load acting on the seat based on the load detection signal, a process in which the control unit records a transition of the load detection signal and a transition of the seat load, a process in which the load sensor detects a collision of the vehicle based on a variance of the load detection signal, a process in which the load sensor outputs a collision signal relative to the control unit by confirming a detection result that the collision of the vehicle occurs, a process in which the control unit detects the collision of the vehicle based on the collision signal, a process in which the control unit specifies a timing when the load sensor detects the collision of the vehicle based on the transition record of the load detection signal, and a process in which the control unit calculates a correction value of the seat load based on a difference value between a stable seat load provided after the control unit detects the collision of the vehicle and a stable seat load provided before the load sensor detects the collision of the vehicle.

According to still further aspect of this disclosure, a seat load detection apparatus includes a load sensor provided at a seat of a vehicle, and a control unit detecting a seat load acting on the seat based on a load detection signal outputted by the load sensor. The load sensor detects a collision of the vehicle based on a variance of the load detection signal and outputs a collision signal relative to the control unit by confirming a detection result that the collision of the vehicle occurs. the control unit detects the collision of the vehicle based on the collision signal, specifies a timing when the load sensor detects the collision of the vehicle based on a transition record of the load detection signal by recording the transition of the load detection signal and the transition of the seat load, and calculates a correction value of the seat load based on a difference value between a stable seat load provided after the control unit detects the collision of the vehicle and a stable seat load provided before the load sensor detects the collision of the vehicle.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
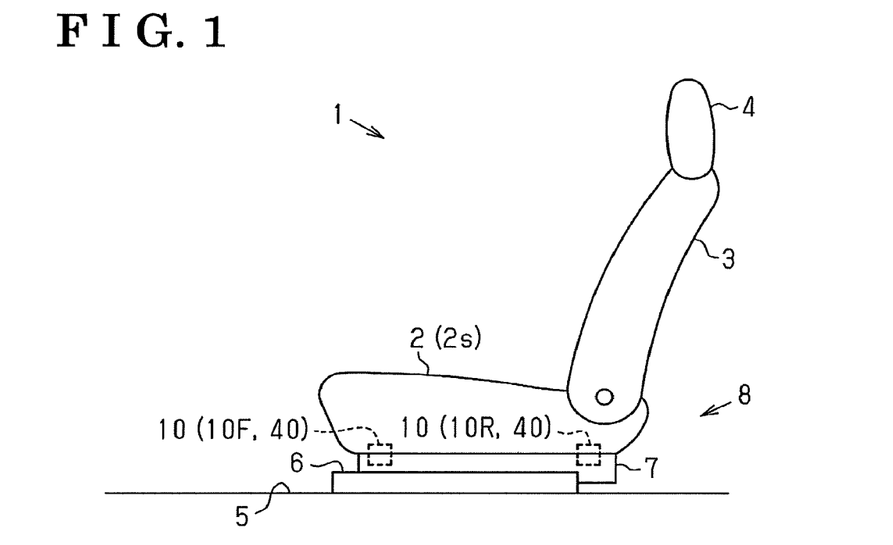
FIG. 1 is a side view of a seat mounted with a load sensor according to an embodiment disclosed here.

A seat load detection method and a seat load detection apparatus of an embodiment will hereunder be explained with reference to the drawings. As illustrated in FIG. 1, a seat 1 for a vehicle includes a seat cushion 2, and a seatback 3 provided so as to be freely inclined relative to a rear end of the seat cushion 2. An upper end of the seatback 3 is provided with a headrest 4.

According to the embodiment, a left-and-right pair of lower rails 6 extending in a vehicle front-rear direction is provided on a floor portion 5 of the vehicle. Each of the lower rails 6 is mounted with an upper rail 7 which is relatively movable on the lower rail 6 along an extending direction thereof. The seat 1 of the embodiment is supported on an upper of a seat sliding device 8 formed by the lower rails 6 and the upper rails 7.

Figure 2:
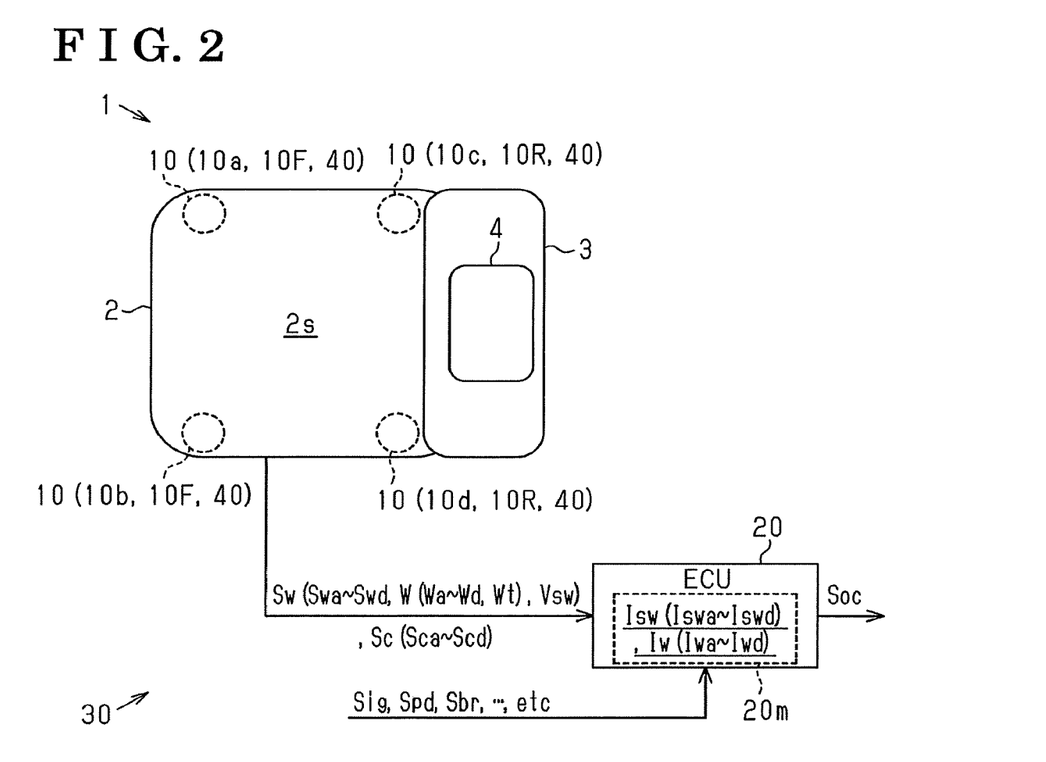
FIG. 2 is a block diagram schematically illustrating a seat load detection apparatus.

As illustrated in FIGS. 1 and 2, in the embodiment, plural load sensors 10 are provided at a lower portion of the seat 1. Specifically, the load sensors 10 (a first load sensor 10a, a second load sensor 10b, a third load sensor 10c, a fourth load sensor 10d) are sandwiched between the upper rails 7 serving as a support member configuring the seat sliding device 8, and the seat 1 supported at an upper portion of the upper rails 7, more specifically, between the upper rails 7 and a frame of the seat cushion 2. These load sensors 10 correspond to known strain gauges. The load sensors 10 are disposed at positions corresponding to four corners of the seat cushion 2 including a seat surface 2s which is formed in a substantially quadrilateral shape.

As illustrated in FIG. 2, a load detection signal Sw (a first load detection signal Swa, a second load detection signal Swb, a third load detection signal Swc, a fourth load detection signal Swd) outputted by each of the load sensors 10 is inputted to an Electric Control Unit 20, or an ECU 20 serving as a control unit. The seat 1 of the embodiment is provided with a seat load detection apparatus 30 for detecting a seat load W acting on the seat 1.

Specifically, the ECU 20 of the embodiment detects the seat load W (a first seat load Wa, a second seat load Wb, a third seat load Wc, a fourth seat load Wd) acting on the seat 1 per position where the first to fourth load sensors 10a to 10d are disposed in response to the first to fourth load detection signals Swa to Swd. That is, the ECU 20 detects the first seat load Wa acting on a right front portion of the seat 1 in response to the first load detection signal Swa outputted by the first load sensor 10a, and detects the second seat load Wb acting on a left front portion of the seat 1 in response to the second load detection signal Swb outputted by the second load sensor 10b. The ECU 20 detects the third seat load Wc acting on a right rear portion of the seat 1 in response to the third load detection signal Swc outputted by the third load sensor 10c, and detects the fourth seat load Wd acting on a left rear portion of the seat 1 in response to the fourth load detection signal Swd outputted by the fourth load sensor 10d.

The ECU 20 of the embodiment calculates a seat load Wt of the whole seat 1 by adding the first to fourth seat loads Wa to Wd of the four portions where the first to fourth load sensors 10a to 10d are disposed (Wt=Wa+Wb+Wc+Wd). The ECU 20 of the embodiment detects a seated state of an occupant seated on the seat 1 based on the first to fourth seat load Wa to Wd of the four portions where the first to fourth load sensors 10a to 10d are disposed, and based on the seat load Wt of the whole seat 1.

Specifically, the ECU 20 of the embodiment detects plural seated states of different types of occupants seated on the seat 1 based on the comparison of the seat load Wt and a predetermined threshold value, more specifically, detects a case where the types of the occupants seated on the seat 1 correspond to "infant or child (luggage or vacant)", "light-weighted adult" and "heavy-weighted adult".

The ECU 20 of the embodiment is inputted with a seatbelt signal Sbr in addition to, for example, a vehicle state of any types and a control signal, for example, an ignition signal Sig of the vehicle and a vehicle speed Spd. The ECU 20 of the embodiment detects that the seated state of the seat 1 corresponds to a state where the child safety seat is mounted on the seat 1 by the combination of on/off information of a buckle of a seatbelt indicated by the seatbelt signal Sbr and the seat load Wt.

The ECU 20 of the embodiment outputs the seated state of the seat 1 detected based on the seat load Wt as an occupant detection signal Soc to a superior ECU. In the vehicle of the embodiment, the operation of an airbag is controlled based on the seated state of the seat 1 indicated by the occupant detection signal Soc.

For example, in a case where the type of the occupant seated on the seat 1 corresponds to an adult at a time of the collision of the vehicle, the expansion control of the airbag is operated (an airbag expansion permission mode). In a case where the type of the occupant seated on the seat 1 corresponds to a child at a time of the collision of the vehicle, the expansion of the airbag is configured to be prohibited (an airbag expansion prohibition mode).

Furthermore, the expansion pressure level of the airbag mounted on the vehicle of the embodiment may be adjusted in two stages. In a case where the occupant on the seat 1 corresponds to a light-weighted adult, the expansion control of the airbag operates with a first expansion pressure level, and in a case where the occupant on the seat 1 corresponds to a heavy-weighted adult, the expansion control of the airbag operates with a second expansion pressure level that is stronger than the first expansion pressure level.

The load sensors 10 (the first load sensor to the fourth load sensor 10a to 10d) provided at the seat 1 of the embodiment include functions as collusion sensors 40 detecting the collision of the vehicle in response to the variance of a load detection signal Sw (Sw1 to Sw4).

Specifically, in each of the load sensors 10 of the embodiment, the output level Vsw of the load detection signal Sw is configured to increase in a case where the seat load W acts in the contracting direction in which the seat cushion 2 is pressed down at the position where the load sensor 10 is provided at the seat 1. In addition, in each of the load sensors 10 of the embodiment, the output level Vsw of the load detection signal Sw is configured to decrease in a case where the seat load W acts in the separating direction in which the seat cushion 2 is lifted up at the position where the load sensor 10 is provided at the seat 1.

Figure 3:
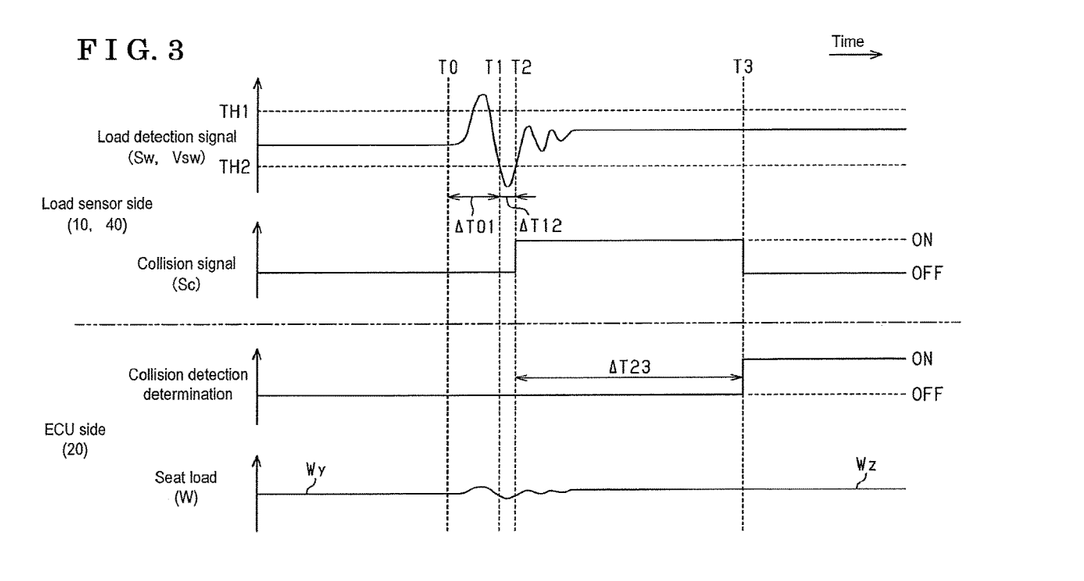
FIG. 3 is a time chart illustrating an output-signal waveform of a rear load sensor and a control signal of an Electric Control Unit, or an ECU when a collision occurs at rear.
Figure 4:
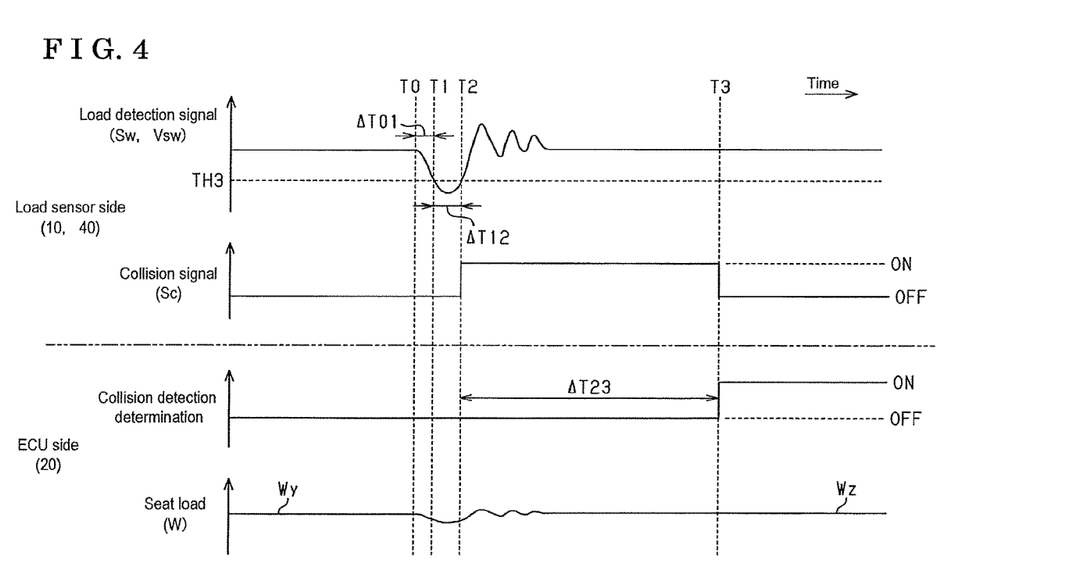
FIG. 4 is a time chart illustrating the output-signal waveform of the rear load sensor and the control signal of the ECU when a collision occurs at front.

As illustrated in FIGS. 3 and 4, each of the load sensors 10 of the embodiment determines the collision of the vehicle in a case where the output level Vsw of the load detection signal Sw decreases equal to or lower than a second threshold value TH2 that is set in the separating direction after the output level Vsw of the load detection signal Sw increases equal to or greater than a first threshold value TH1 that is set in the contracting direction. Each of the load detection sensors 10 also determines the collision of the vehicle in a case where the output level Vsw of the load detection signal Sw decreases equal to or lower than a third threshold value TH3 that is set in the separating direction. In addition, each of the load sensors 10 of the embodiment outputs collision signals Sc (a first collision signal Sca, a second collision signal Scb, a third collision sensor Scc, a fourth collision sensor Scd) relative to the ECU 20 by confirming a detection result that the collision of the vehicle occurs. FIGS. 3 and 4 illustrate output-signal wave form (the load detection signal Sw, the collision signal Sc) of the rear sensor 10R (the third load sensor 10c, the fourth load sensor 10d, see FIG. 2) when the rear collision and the front collision occur, and the relationship of the wave form of the load detection signal Sw generated when the front collision and the rear collision occur corresponds to be opposite at the front sensor 10F (the first load sensor 10a, the second load sensor 10b). The ECU 20 of the embodiment detects the collision of the vehicle in response to the collision signal Sc outputted by the load sensor 10.

Figure 5:
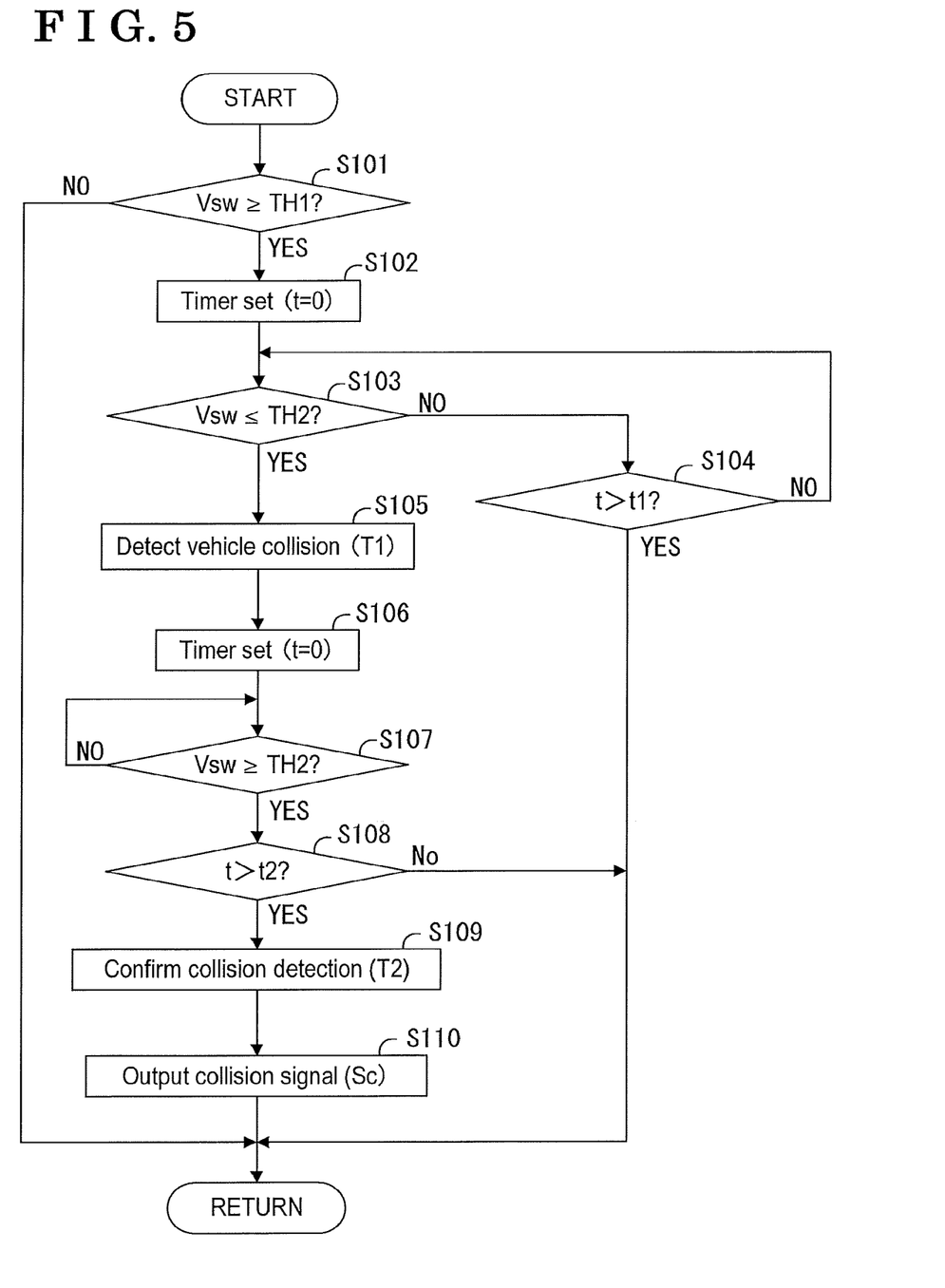
FIG. 5 is a flowchart illustrating a procedure of a collision detection and a collision signal output by the load sensor in response to a variance of a load detection signal provided when the collision occurs at rear.

Specifically, as illustrated in the flowchart in FIG. 5, each of the load sensors 10 of the embodiment determines whether the output level Vsw of the load detection signal Sw increases equal to or greater than the first threshold value TH1 (Step 101). Then, each of the load sensors 10 sets a timer for timing (t=0, Step S102) in a case where the output level Vsw of the load detection signal Sw increases equal to or greater than the first threshold value TH1 (Vsw≥TH1, Step S101:YES), then, determines whether the output level Vsw of the load detection signal Sw decreases equal to or lower than the second threshold value TH2 (Step S103). In a case where the output level Vsw of the load detection signal Sw decreases equal to or lower than the second threshold value TH2 (Vsw≤TH2, Step S103: YES), the load sensor 10 detects the collision of the vehicle (Step S105, see Timing T1 in FIG. 3).

Next, each of the load sensors 10 counts a time t from a time when each of the load sensors 10 sets the timer again (t=0, Step S102) to a time when the output level Vsw of the load detection signal Sw increases equal to or greater than the second threshold value TH2 (Vsw≥TH2, Step S107: YES), that is, the time t when the output level Vsw of the load detection signal Sw is below the second threshold value TH2. Then, in a case where the time t when the output level Vsw of the load detection signal Sw being lower than the second threshold value TH2 is greater than a predetermined time t2 (t>t2, Step S108: YES), the load sensor 10 confirms the detection result of the collision of the vehicle in Step S105 (Step S109, see FIG. 3, timing T2), and outputs the collision signal Sc (On output) to the ECU 20 (Step S110).

In a case where each of the load sensors 10 of the embodiment determines that the output level Vsw fo the load detection signal Sw is lower than the first threshold value TH1 in Step 101 (Vsw<TH1, Step S101: NO), the load sensor 10 does not perform processes after Step S102. In a case where a predetermined time t1 has elapsed in Step S104 (time over, t>t1, Step S104: YES), the load sensor 10 does not perform processes after Step S105. In Step S108, in a case where the time t when the output level Vsw of the load detection signal Sw is below the second threshold value TH2 is equal to or shorter than the predetermined time t2 (t≤t2, Step S109: NO), the load sensor 10 does not perform each of the processes of Step S109 and Step S110. That is, the load sensor 10 does not output the collision signal Sc to the ECU 20.

Figure 6:
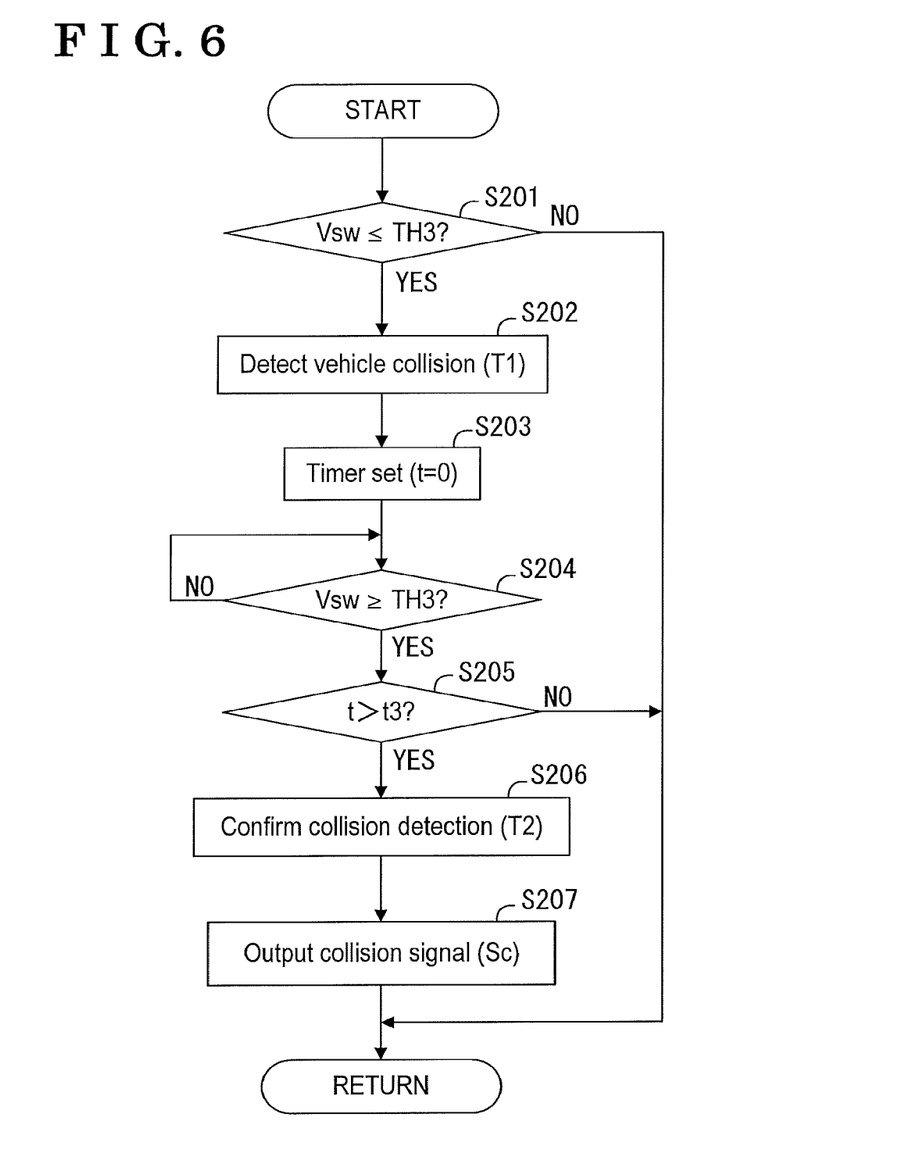
FIG. 6 is a flowchart illustrating a procedure of a collision detection and a collision signal output by the load sensor in response to a variance of a load detection signal provided when the collision occurs at front.

As illustrated in a flowchart in FIG. 6, the load sensor 10 of the embodiment determines whether the output level Vsw of the load detection signal Sw decreases equal to or lower than the third threshold value TH3 (Step S201). In a case where the output level Vsw of the load detection signal Sw decreases equal to or lower than the third threshold value TH3 (Vsw≥TH3, Step S201: YES), the load sensor 10 detects the collision of the vehicle (Step S202, see FIG. 4, the timing T1).

Next, each of the load sensors 10 counts the time t from a time when each of the load sensors 10 sets the timer (t=0, Step S203) to a time when the output level Vsw of the load detection signal Sw increases equal to or greater than the third threshold value TH3 (Vsw≥TH3, Step S204: YES), that is, the time t when the output level Vsw of the load detection signal Sw being lower than the third threshold value TH3 is greater than the third predetermined time t3 (t>t3, Step S205: YES), the load sensor 10 confirms the detection result of the collision of the vehicle in Step S202 (Step S206, see FIG. 4, Timing T2), and outputs the collision signal Sc to the ECU(Step S207).

In a case where the load sensor 10 of the embodiment determines that the output level Vsw of the load detection signal Sw is greater than the third threshold value TH3 (Vsw>TH3, Step S201: NO), the load sensor 10 does not perform the processes after Step S202. Then, in a case where the time t when the output level Vsw of the load detection signal Sw is below the third threshold value TH3 is equal to or shorter than the predetermined time t3 in Step S205 (t≤t3, Step S205: NO), the load sensor 10 does not perform the processes of Steps S206 and S207.

Figure 7:
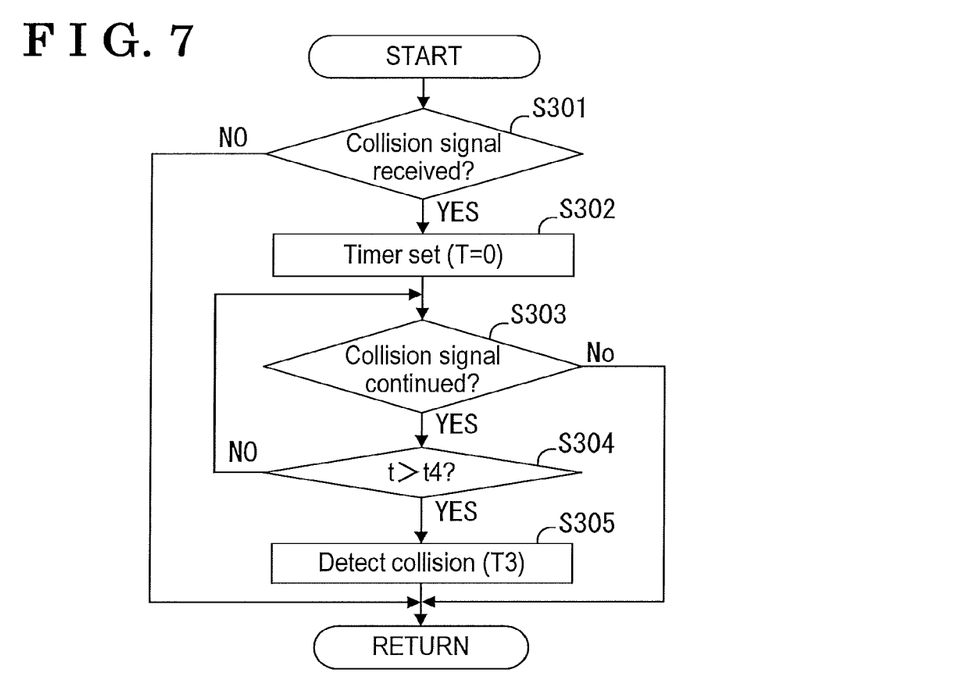
FIG. 7 is a flowchart illustrating a procedure of a collision detection by the ECU in response to the collision signal.

Meanwhile, as illustrated in a flowchart in FIG. 7, when receiving the collision signal Sc outputted by the load sensor 10 (Step S301), the ECU 20 of the embodiment sets the timer for timing (t=0, Step S302), and determines whether the input of the collision signal continues (Step S303). In a case where the time t when the collision signal Sc continuously is inputted is longer than the predetermined time t4 (t>t4, Step S304: YES), the load sensor 10 is configured to detect the collision of the vehicle (Step S305, see FIGS. 3 and 4, timing T3).

In Step S303, in a case where the collision signal Sc stops being inputted (Step S303: NO), the ECU 20 does not perform the processes of Step 304 and Step 305. In a case where the collision of the vehicle is detected in Step 305, a detection confirmation signal is outputted relative to the load sensor 10 outputting the collision signal. The load sensor 10 is configured not to output the collision signal Sc by the reception of the detection confirmation signals.

Figure 8:
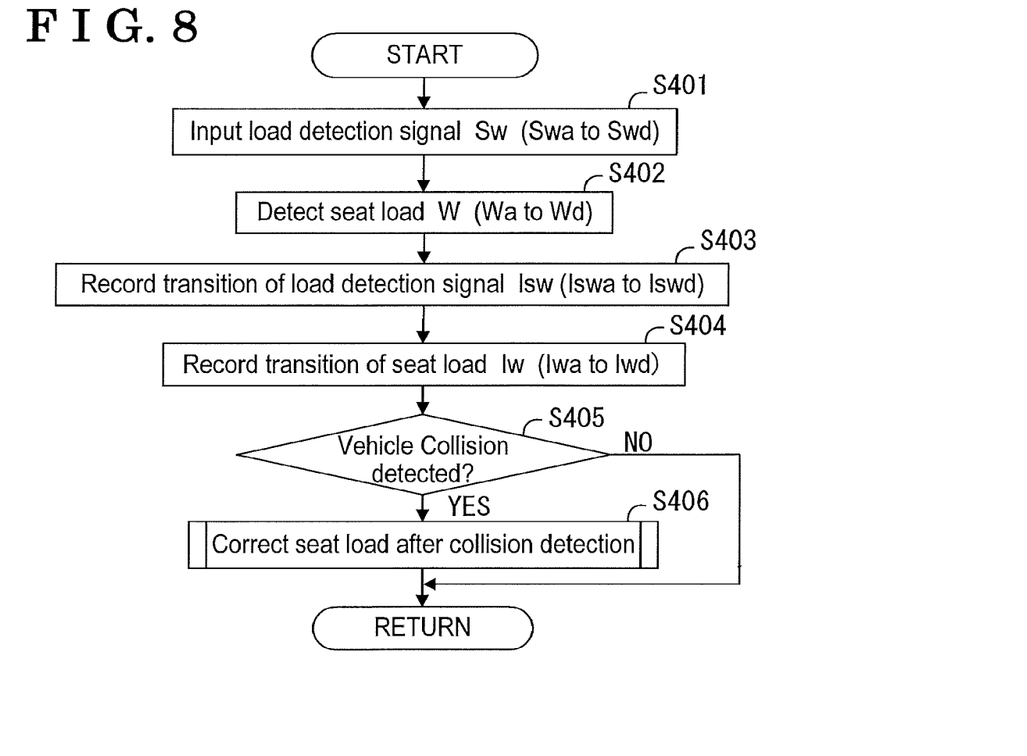
FIG. 8 is a flowchart illustrating a transition record of the load detection signal and the seat load, and a mode of correction process of the seat load in response to a collision detection of a vehicle performed by the ECU.

As illustrated in a flowchart in FIG. 8, the ECU 20 of the embodiment detects the seat load W (the first seat load Wa to the fourth seat load Wd) of the positions where the load sensors 10 (10a, 10b, 10c, 10d) are mounted by the input of the load detection signal Sw (the first load detection signal Swa to the fourth load detection signal Swd) (Steps S401 and S402), and records the transition of the load detection signal Sw and the seat load W. (Steps S403 and S404).

Specifically, the ECU 20 of the embodiment maintains a transition memory Isw (a first transition memory Iswa, a second transition memory Iswb, a third transition memory Iswc, a fourth transition memory Iswd) of (the output level Vsw of) the load detection signal SW illustrated in FIGS. 3 and 4 in a memory range 20$m$ (see FIG. 2) per the load sensor 10 (the first load sensor 10$a$ to the fourth load sensor 10$d$). In addition, the ECU 20 of the embodiment maintains a transition memory Iw (a first transition memory Iswa, a second transition memory Iswb, a third transition memory Iswc, a fourth transition memory Iswd) of (the output level Vsw of) the seat load W detected in response to the load detection signal Sw in the memory range 20$m$ per (the disposed position of) the load sensor 10 (see FIG. 2). The ECU 20 of the embodiment detects the seat load W based on the load detection signal Sw, and the value of the seat load W corresponds to a load equivalent value, or a load corresponding value after the load detection signal Sw is filtered. The ECU 20 of the embodiment performs the correction process of the seat load W detected after the collision is detected based on the transition record Isw of the load detection signal Sw and the transition record Iw of the seat load W (Step S406).

Figure 9:
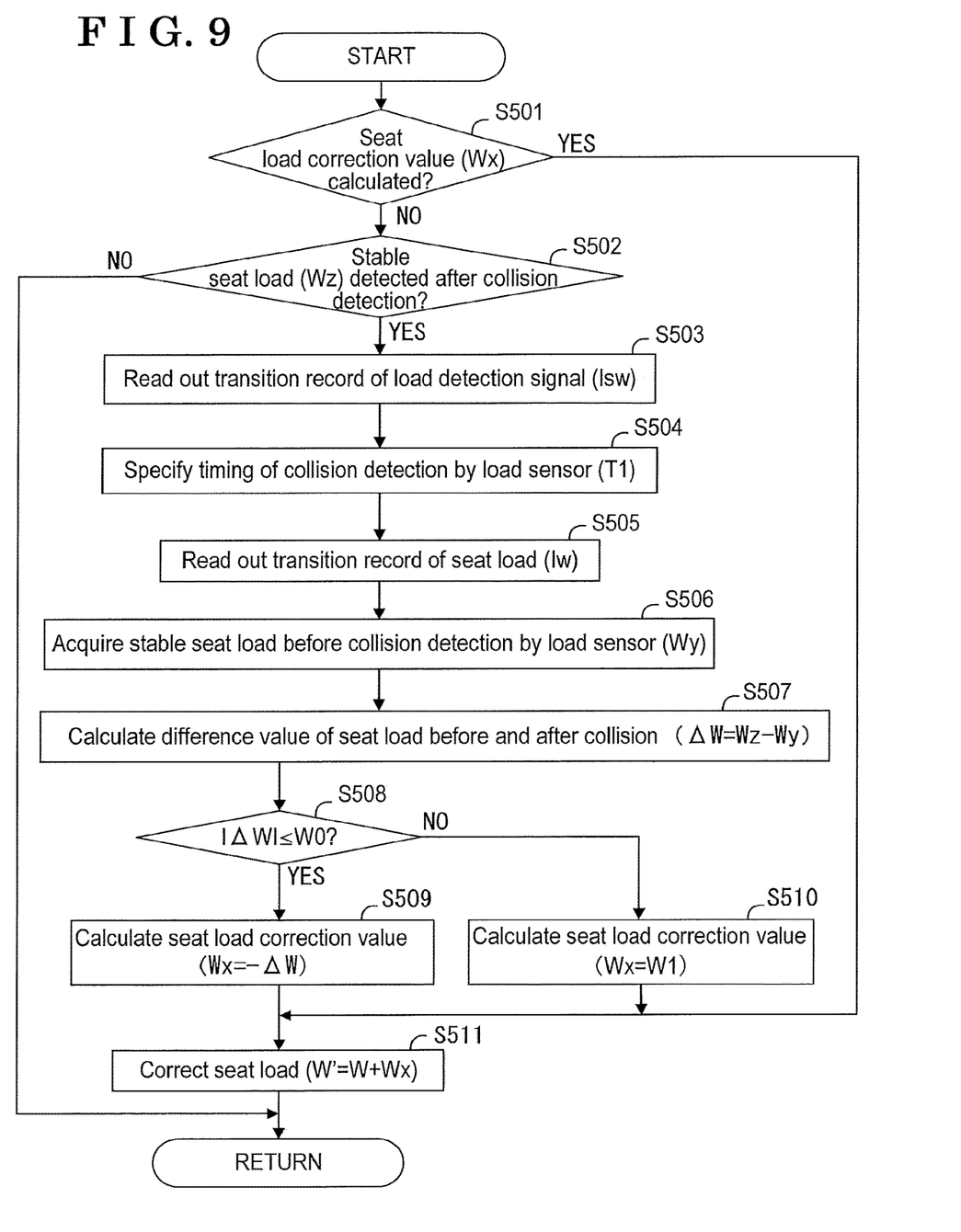
FIG. 9 is a flowchart illustrating a process of a seat load correction performed by the ECU after the collision is detected.

More specifically, as illustrated in a flowchart in FIG. 9, the ECU 20 of the embodiment determines whether a correction value Wx of the seat load W has been calculated in the seat load correction process (see FIG. 8, Step S406) after the collision is detected (Step S501). In a case of not having calculated the correction value Wx of the seat load W (Step S501: NO), the ECU 20 consequently determines whether a stable seat load Wz provided after the collision of the vehicle is detected (Step S502). The ECU 20 of the embodiment determines that the value of the seat load W is stable in a case where the variance of the seat load W within the predetermined time is within a predetermined range. Furthermore, in a case where the stable seat load Wz provided after the collision of the vehicle is detected (Step S502: YES), the ECU 20 reads out the transition record Isw of the load detection signal Sw (Step S503) and the load sensor 10 specifies the timing T1 when the load sensor 10 detects the collision of the vehicle (Step S504, see FIGS. 3 and 4). Then, the ECU 20 reads out the transition record Iw of the seat load W (Step S505), and the load sensor 10 acquires the stable seat load Wy provided before the collision of the vehicle is detected (Step S506).

Next, the ECU 20 subtracts the stable seat load Wy provided before the load sensor 10 detects the collision of the vehicle from the stable seat load Wz provided after the ECU 20 detects the collision of the vehicle as a difference value $\Delta W$ between the stable seat loads Wy, Wz provided before and after the collision of the vehicle ($\Delta W=Wz-Wy$, Step S507). In addition, the ECU 20 of the embodiment determines whether the difference value $\Delta W$ between the stable seat loads Wy, Wz provided before and after the collision of the vehicle is within the predetermined range, specifically, whether the absolute value ($|\Delta W|$) is equal to or lower than a predetermined threshold value WO (Step S508). In a case where the difference value $\Delta W$ between the stable seat values Wy, Wz provided before and after the collision of the vehicle is within a predetermined range (($|\Delta W| \leq WO$, Step S508: YES), the ECU 20 sets the correction value Wx of the seat load W after the collision detected based on the difference value $\Delta W$ ($Wx=-\Delta W$, Step S509).

In a case where the difference value $\Delta W$ between the stable seat loads Wy, Wz provided before and after the collision of the vehicle is greater than the predetermined range in Step S508 ($|\Delta W|>WO$, Step S508: NO), the ECU 20 sets the correction value Wx of the seat load W to be a predetermined value W1 after the collision is detected ($Wx=W1$, Step S510). The ECU 20 corrects the seat load W detected after the collision is detected using the correction value Wx calculated in either Step 510 or Step 509 ($Wx'=W+Wx$, Step S511).

Next, the actions of the seat load detection apparatus 30 that may be attained will hereunder be explained.

The seat load detection apparatus 30 of the embodiment is configured such that the load sensors 10 (the first load sensor 10$a$ to the fourth load sensor 10$d$) include a function as the collision sensors 40 detecting the collision of the vehicle based on the variance of the load detection signal Sw (the first load detection signals Sw1 to the fourth detection signals Sw4). The ECU 20 detects the collision of the vehicle based on the collision signal Sc outputted by the load sensor 10.

That is, as illustrated in FIGS. 3 and 4, the ECU 20 detects the collision of the vehicle while delaying by a time $\Delta T12$ from when the load sensor 10 detects the collision of the vehicle based on the variance of the load detection signal Sw to when the load sensor 10 outputs the collision signal Sc by the confirmation of the detection result, and by a time $\Delta T23$ for confirming that the input of the collision signal Sc has been continued. Then, as described above, the time $\Delta T12$ from when the load sensor 10 detects the collision of the vehicle to when the load sensor 10 outputs the collision signal Sc corresponds to a variance value that does not always be a constant value.

Based on this point, the ECU 20 of the embodiment maintains the transition record Isw of the load detection signal Sw in addition to the transition record Iw of the seat load W detected based on the load detection signal Sw. Furthermore, the ECU 20 specifies the timing T1 when the load sensor 10 detects the collision of the vehicle in response to the variance of the load detection signal Sw based on the transition record Isw of the load detection signal Sw after the collision of the vehicle is detected. Accordingly, by acquiring the stable seat load Wy provided before the load sensor 10 detects the collision of the vehicle from the transition record Iw of the seat load W, the ECU 20 may precisely calculate the correction value Wx of the seat load W after the collision is detected based on the difference value $\Delta W$ that is between the stable seat load Wy, and the stable seat load Wz provided after the collision of the vehicle is detected.

According to the embodiment, the following effects and advantages may be attained.

The seat load detection apparatus 30 includes the load sensor 10 provided at the seat 1 and the ECU 20 serving as the control unit detecting the seat load W in response to the load detection signal Sw outputted by the load sensor 10. The load sensor 10 detects the collision of the vehicle based on the variance of the load detection signal Sw, and outputs the collision signal Sc relative to the ECU 20 by confirming the detection result. The ECU 20 detects the collision of the vehicle based on the collision signal Sc. The ECU 20 records the transition of the load detection signal Sw and the seat load W. The ECU 20 specifies the timing T1 when the load sensor 10 detects the collision of the vehicle based on the transition record Isw of the load detection signal Sw, and calculates the correction value Wx of the seat load W based on the difference value $\Delta W$ between the stable seat load Wz provided after the detection of the collision of the vehicle, and the stable seat load Wy provided before the detection of the collision of the vehicle.

According to the aforementioned configuration, even in a case where the time $\Delta T12$ from when the load sensor 10 detects the collision of the vehicle based on the variance of the load detection signal Sw to when the load sensor 10 outputs the collision signal Sc by confirming the detection result is not always constant, the stable seat load Wy provided before the load sensor 10 detects the collision of the vehicle may be correctly acquired. Accordingly, in the configuration in which the load sensor 10 functions as the collision sensors 40, the seat load W that is detected after the collision of the vehicle is detected based on the collision signal SC may be precisely corrected.

The ECU 20 determines whether the difference value ΔW between the stable seat loads Wy, Wz provided before and after the collision of the vehicle is within a predetermined range (Step S508). In a case where the difference value ΔW between the seat values Wy, Wz is within the predetermined range ((IΔWI≤WO, Step S508: YES), the ECU 20 sets the correction value Wx of the seat load W after the detection of the collision based on the difference value ΔW (Wx=−ΔW, Step S509). In a case where the difference value ΔW is greater than the predetermined range in Step S508 (IΔWI>WO, Step S508: NO), the ECU 20 sets the correction value Wx of the seat load W to be the predetermined value W1 after the collision is detected (Wx=W1, Step S510).

According to the aforementioned configuration, the seat load W before the correction and the seat load W' (=W+Wx) after the correction may not be largely separated from each other.

Accordingly, the continuity and the stability of the seat load detection may be secured.

The aforementioned embodiment may be modified as follows.

According to the aforementioned embodiment, the load sensors 10 (the first load sensor 10a to the fourth load sensor 10d) are provided at positions corresponding to the four corners of the seat cushion 2 at the lower portion of the seat 1. Alternatively, the number and the disposition of the load sensors 10 provided at the seat 1 may be freely changed. Parts of the plural load sensors 10 may include a function as the collision sensors 40 outputting the collision signal Sc based on the variance of the load detection signal Sw. The number and the disposition of the parts of the load sensors 10 having the function as the collision sensors 40 may be freely changed.

According to the aforementioned embodiment, the load sensors 10 determine the collision of the vehicle in a case where the output level Vsw of the load detection signal Sw decreases equal to or lower than the second threshold value TH2 after the increase of equal to or greater than the first threshold value TH1 (see FIG. 3), or in a case where the output level Vsw of the load detection signal Sw decreases equal to or lower than the third threshold value TH3 (see FIG. 4). Alternatively, the load sensors 10 may determine the collision of the vehicle in response to only one of the two variance patterns. Furthermore, for example, the collision of the vehicle may be detected by other variance patterns, for example, in a case where the output level Vsw of the load detection signal Sw increases equal to or greater than a predetermined threshold value after decreasing equal to or lower than a predetermined threshold value.

According to the aforementioned embodiment, the load sensors 10 outputs the collision signal Sc by confirming a detection result of the collision of the vehicle in a case where the output level Vsw of the load detection signal Sw that varies higher than the predetermined threshold value (TH2 or TH3) being set in the separating direction includes the time t that is shorter than the threshold value and that is longer than the predetermined time (t2, t3). Alternatively, as a determination condition for outputting the collision signal Sc by the confirmation of the detection result of the collision of the vehicle after the detection of the collision of the vehicle by the load sensor 10, for example, other determination condition which, for example, the load sensor 10 outputs the collision signal Sc based on the total time when the load detection signal Sw varying higher than the predetermined threshold value being set in the separating direction is lower than the threshold value.

In the aforementioned embodiment, in a case where the load sensor 10 detects the collision of the vehicle based on the collision signal Sc outputted by the load sensor 10, the correction process of the seat load W is performed based on the difference value ΔW between the stable seat loads Wy, Wz provided before and after the collision of the vehicle. Alternatively, in addition to the difference value ΔW, the collision mode may be specified in response to the variance pattern of the load detection signal Sw, the variance pattern that the load sensor 10 detects the collision of the vehicle. The correction process of the seat load W may be operated in accordance with the specified collision mode.

In the aforementioned embodiment, in a case where the variance width of the seat load W within the predetermined time is within the predetermined range, the value of the seat load W detected in response to the load detection signal Sw outputted by the load sensor 10 is determined to be stable. Alternatively, the stability confirmation determination of the seat load W may be freely changed.

Figure 10:
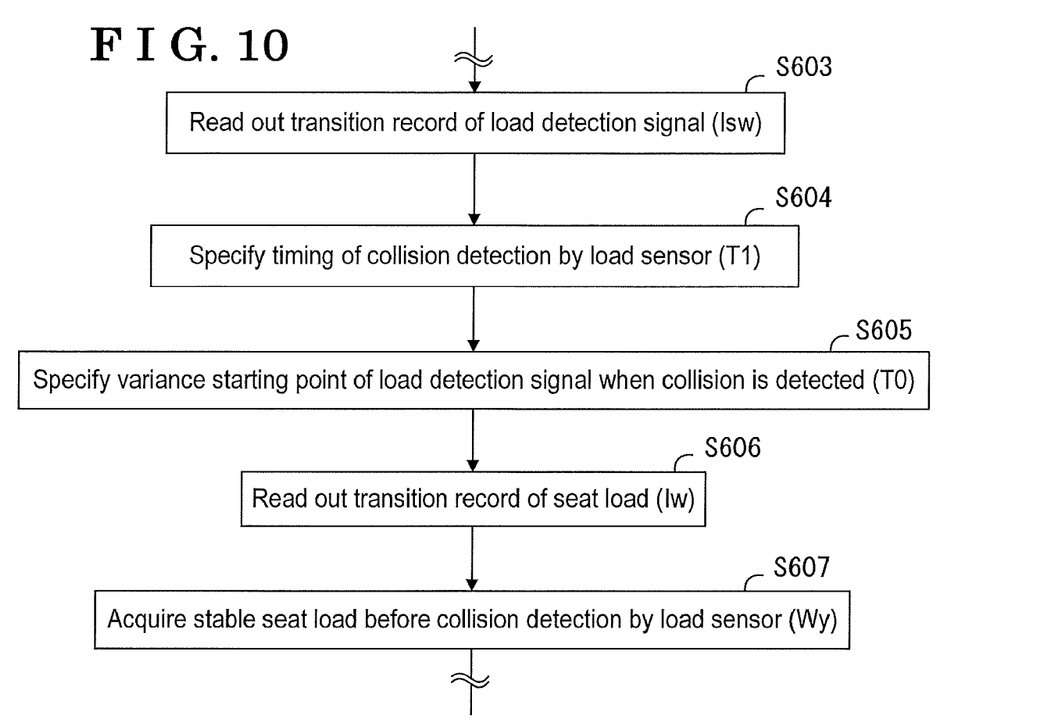
FIG. 10 is a flowchart illustrating another example of a seat load correction performed by the ECU.

As illustrated in the flow chart in FIG. 10, similarly to the aforementioned embodiment, the transition record Isw of the load detection signal Sw is read out (Step S603) and the timing T1 when the load sensor 10 detects the collision of the vehicle is specified (step S604, see FIGS. 3 and 4). Furthermore, a variance starting point T0 of the load detection signal Sw that causes the load sensor 10 to detect the collision of the vehicle, that is, a timing in which the collision load of the vehicle is inputted first relative to the load sensor 10 is determined (Step S605). The correction value Wx of the seat load W may be calculated by using the record of the seat load W detected before the variance starting point T0 of the load detection signal Sw (Steps S606 and S607).

Each of the processes of Steps S601 and S602, and after Step S608 in the flowchart in FIG. 10 is the same as each of the processes of Steps S501 and S502, and after Step S507 in the flowchart in FIG. 9.

That is, as shown in FIGS. 3 and 4, normally, the stable seat load Wy before the load sensor 10 detects the collision of the vehicle may be obtained by going back the transition record Isw of the seat load W from the timing T1 when the load sensor 10 detects the collision of the vehicle for equal to or longer than the time T01 that is required by the load sensor 10 to detect the collision of the vehicle in response to the variance of the load detection signal Sw. Accordingly, the stability confirmation determination of the seat load W may be simplified.

In the aforementioned embodiment, the ECU 20 calculates a value subtracting the stable seat load Wy provided before the load sensor 10 detects the collision of the vehicle from the stable seat load Wz provided after the ECU 20 detects the collision of the vehicle as the difference value ΔW between the stable seat loads Wy, Wz provided before and after the collision of the vehicle (ΔW=Wz−Wy, Step S507). Then, the ECU 20 corrects the seat load W by adding the minus value to the seat load (Wx=−ΔW, Wx'=W+Wx, Steps S509 and S511). Alternatively, the ECU 20 may subtract the stable seat load Wz provided after the collision of the vehicle from the stable seat load Wy provided before the load sensor 10 detects the collision of the sensor, and correct the seat load W by adding the value to the seat load W (Wx'=W+(Wy−Wz)). In a case where the difference value ΔW between the stable seat loads Wy, Wz provided before and after the collision of the vehicle is greater than the predetermined range in Step S508 (IΔWI>WO, Step S508: NO), the predetermined value W1 set by the ECU 20 as the correction value Wx of the seat load W may be the same or the different value as the threshold value WO defining the predetermined range.

Figure 11:
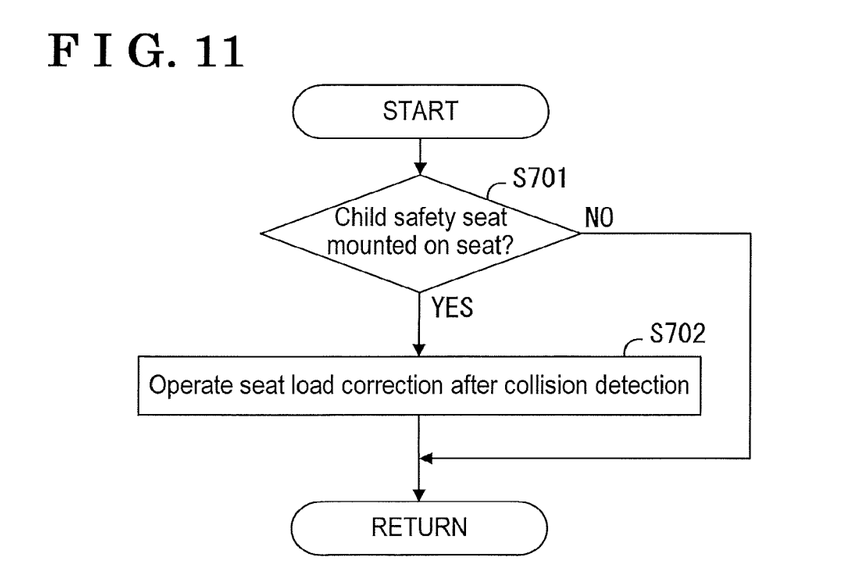
FIG. 11 is a flow chart illustrating still another example of a seat load correction performed by the ECU.

As illustrated in the flow chart in FIG. 11, the ECU 20 determines whether the seat 1 is mounted with a child safety seat (Step S701). The mode for determination of the disposition of the child safety seat may be freely changed. In a case where the child safety seat is mounted (Step 701: YES), the seat load correction process after the detection of the collision (see FIG. 9) may be performed by the calculation of the correction value Wx based on the difference value ΔW between the stable seat loads Wy, Wz provided before and after the collision of the vehicle (Step S702).

That is, the detection error of the seat load W due to the collision of the vehicle may often be a problem in a case where the possibility of the misdetermination that the occupant is seated on the seat 1 in the seated state determination is high, for example, in a case where the seat 1 is mounted with a child safety seat. Thus, the aforementioned embodiment will obtain further prominent effectiveness.

According to the aforementioned embodiment, the seat load detection method includes a process in which the load sensor (10) provided at the seat (1) of the vehicle outputs the load detection signal (Sw, Swa, Swb, Swc, Swd) relative to the control unit (20), a process in which the control unit (20) detects the seat load (W, Wa, Wb, Wc, Wd, Wt) acting on the seat (1) based on the load detection signal (Sw, Swa, Swb, Swc, Swd), a process in which the control unit (20) records the transition of the load detection signal (Sw, Swa, Swb, Swc, Swd) and the transition of the seat load (W, Wa, Wb, Wc, Wd, Wt), a process in which the load sensor (10) detects the collision of the vehicle based on the variance of the load detection signal (Sw, Swa, Swb, Swc, Swd), a process in which the load sensor (10) outputs the collision signal (Sc, Sca, Scb, Scc, Scd) relative to the control unit (20) by confirming the detection result that the collision of the vehicle occurs, a process in which the control unit (20) detects the collision of the vehicle based on the collision signal (Sc, Sca, Scb, Scc, Scd), a process in which the control unit (20) specifies the timing (T1) when the load sensor (10) detects the collision of the vehicle based on the transition record (Isw, Iwsa, Iswb, Iswc, Iswd) of the load detection signal (Sw, Swa, Swb, Swc, Swd), and a process in which the control unit (20) calculates the correction value (Wx) of the seat load (W, Wa, Wb, Wc, Wd, Wt) based on the difference value (ΔW) between the stable seat load (Wz) provided after the control unit (20) detects the collision of the vehicle and the stable seat load (Wy) provided before the load sensor (10) detects the collision of the vehicle.

According to the aforementioned configuration, even in a case where the time from when the load sensor detects the collision of the vehicle in response to the variance of the load detection signal to when the load sensor outputs the collision signal by confirming the detection result is not always constant, the load sensor may precisely obtain the stable seat load before detecting the collision of the vehicle. Accordingly, in a configuration in which the load sensor functions as the collision sensor, the seat load that is detected after the collision is detected based on the collision signal may be precisely corrected.

According to the aforementioned embodiment, the process in which the control unit (20) calculates the correction value (Wx) of the seat load (W, Wa, Wb, Wc, Wd, Wt) includes processes of specifying the variance starting point (T0) of the load detection signal (Sw, Swa, Swb, Swc, Swd) that causes the load sensor (10) to detect the collision of the vehicle based on the transition record (Isw, Iwsa, Iswb, Iswc, Iswd) of the load detection signal (Sw, Swa, Swb, Swc, Swd), and calculating the correction value (Wx) of the seat load (W, Wa, Wb, Wc, Wd, Wt) by using the record of the seat load (W, Wa, Wb, Wc, Wd, Wt) detected before the variance starting point (T0).

That is, the stable seat load Wy before the load sensor 10 detects the collision of the vehicle may be obtained by going back the transition record Isw of the seat load W from the timing T1 when the load sensor 10 detects the collision of the vehicle to a time prior to the variance starting point of the load detection signal that causes the load sensor 10 to detect the collision of the vehicle, that is, for equal to or longer than the time T01 that is required for the load sensor 10 to detect the collision of the vehicle in response to the variance of the load detection signal Sw. Accordingly, the stability confirmation determination of the seat load W may be simplified.

According to the aforementioned embodiment, the process in which the control unit (20) calculates the correction value (Wx) of the seat load (W, Wa, Wb, Wc, Wd, Wt) further includes processes of setting the correction value (Wx) based on the difference value (ΔW) in a case where the difference value (ΔW) is within the predetermined range, and setting the correction value (Wx) to be the predetermined value in a case where the difference value (ΔW) is greater than the predetermined range.

According to the aforementioned configuration, the seat loads before and after correction may not be largely dissociated from each other. Accordingly, the continuity and the stability of the seat load detection may be maintained.

According to the aforementioned embodiment, the process in which the control unit (20) calculates the correction value (Wx) of the seat load (W, Wa, Wb, Wc, Wd, Wt) further includes processes of detecting that the child safety seat is mounted on the seat (1), and calculating the correction value (Wx) of the seat load (W, Wa, Wb, Wc, Wd, Wt) in a case where the child safety seat is mounted on the seat (1).

That is, the detection error of the seat load due to the collision of the vehicle may often be a problem in a case where the possibility of the misdetermination that the occupant is seated on the seat 1 in the seated state determination is high, for example, in a case where the seat 1 is mounted with a child safety seat. Thus, the aforementioned embodiment will obtain further prominent effectiveness.

According to the aforementioned embodiment, the seat load detection apparatus (30), includes the load sensor (10) provided at the seat (1) of the vehicle; and the control unit (20) detecting the seat load (W, Wa, Wb, Wc, Wd, Wt) acting on the seat (1) based on the load detection signal (Sw, Swa, Swb, Swc, Swd) outputted by the load sensor(10). The load sensor (10) detects the collision of the vehicle based on the variance of the load detection signal (Sw, Swa, Swb, Swc, Swd) and outputs the collision signal (Sc, Sca, Scb, Scc, Scd) relative to the control unit (20) by confirming the detection result that the collision of the vehicle occurs. The control unit (20) detects the collision of the vehicle based on the collision signal (Sc, Sca, Scb, Scc, Scd), specifies the timing (T1) when the load sensor (10) detects the collision of the vehicle based on the transition record (Isw, Iwsa, Iswb, Iswc, Iswd) of the load detection signal (Sw, Swa, Swb, Swc, Swd) by recording the transition of the load detection signal and the transition of the seat load, and calculates the correction value (Wx) of the seat load (W, Wa, Wb, Wc, Wd, Wt) based on the difference value (ΔW) between the stable seat load (Wz) provided after the control unit (20) detects the collision of the vehicle and the stable seat load (Wy) provided before the load sensor (10) detects the collision of the vehicle.

According to the aforementioned embodiment, the control unit (20) calculates the correction value (Wx) of the seat load (W, Wa, Wb, Wc, Wd, Wt) by using the record thereof detected before the variance starting point (T0) that causes the load sensor (10) to detect the collision of the vehicle by specifying the variance starting point (T0) of the load detection signal (Sw, Swa, Swb, Swc, Swd) based on the transition record (Isw, Iwsa, Iswb, Iswc, Iswd) of the load detection signal (Sw, Swa, Swb, Swc, Swd).

According to the disclosure, in the configuration in which the load sensor provided at the seat functions as the collision sensor, the seat load detected after the collision is detected in response to the collision signal may be precisely corrected.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat load detection method comprising:
   providing a load sensor at a seat of a vehicle outputs a load detection signal relative to a control unit;
   detecting, using the control unit, a seat load acting on the seat based on the load detection signal;
   recording, using the control unit, a transition of the load detection signal and a transition of the seat load;
   detecting, using the load sensor, a collision of the vehicle based on a variance of the load detection signal;
   outputting, using the load sensor, a collision signal relative to the control unit by confirming a detection result that the collision of the vehicle occurs;
   detecting, using the control unit, the collision of the vehicle based on the collision signal;
   specifying, using the control unit, a timing when the load sensor detects the collision of the vehicle based on the transition record of the load detection signal; and
   calculating, using the control unit, a correction value of the seat load based on a difference value between a stable seat load provided after the control unit detects the collision of the vehicle and a stable seat load provided before the load sensor detects the collision of the vehicle, a seat load being stable when a variance of the seat load is within a predetermined time is within a predetermined range.

2. The seat load detection method according to claim 1, wherein the calculating the correction value of the seat load includes
   specifying a variance starting point of the load detection signal that causes the load sensor to detect the collision of the vehicle based on the transition record of the load detection signal; and
   calculating the correction value of the seat load by using a record of the seat load detected before the variance starting point.

3. The seat load detection method according to claim 1, wherein the calculating the correction value of the seat load further includes
   setting the correction value based on a difference value in a case where the difference value is within a predetermined range; and
   setting the correction value to be a predetermined value in a case where the difference value is greater than the predetermined range.

4. The seat load detection method according to claim 2, wherein the calculating the correction value of the seat load further includes
   setting the correction value based on a difference value in a case where the difference value is within a predetermined range; and
   setting the correction value to be a predetermined value in a case where the difference value is greater than the predetermined range.

5. The seat load detection method according to claim 1, wherein the calculating the correction value of the seat load further includes
   detecting that a child safety seat is mounted on the seat; and
   calculating the correction value of the seat load in a case where the child safety seat is mounted on the seat.

6. The seat load detection method according to claim 2, wherein the calculating the correction value of the seat load further includes
   detecting that a child safety seat is mounted on the seat; and
   calculating the correction value of the seat load in a case where the child safety seat is mounted on the seat.

7. The seat load detection method according to claim 3, wherein the calculating the correction value of the seat load further includes
   detecting that a child safety seat is mounted on the seat; and
   calculating the correction value of the seat load in a case where the child safety seat is mounted on the seat.

8. A seat load detection apparatus, comprising:
   a load sensor provided at a seat of a vehicle; and
   a control unit detecting a seat load acting on the seat based on a load detection signal outputted by the load sensor,
   wherein the load sensor detects a collision of the vehicle based on a variance of the load detection signal and outputs a collision signal relative to the control unit by confirming a detection result that the collision of the vehicle occurs, and
   wherein the control unit is configured to
      detect the collision of the vehicle based on the collision signal;
      specify a timing when the load sensor detects the collision of the vehicle based on a transition record of the load detection signal by recording the transition of the load detection signal and the transition of the seat load; and
      calculate a correction value of the seat load based on a difference value between a stable seat load provided after the control unit detects the collision of the vehicle and a stable seat load provided before the load sensor detects the collision of the vehicle, a seat load being stable when a variance of the seat load is within a predetermined time is within a predetermined range.

9. The seat load detection apparatus according to claim 8, wherein the control unit is configured to calculate the correction value of the seat load by using a record thereof detected before a variance starting point of the load detection signal that causes the load sensor to detect the collision of the vehicle by specifying the variance starting point of the load detection signal based on the transition record of the load detection signal.

\* \* \* \* \*